UNITED STATES PATENT OFFICE.

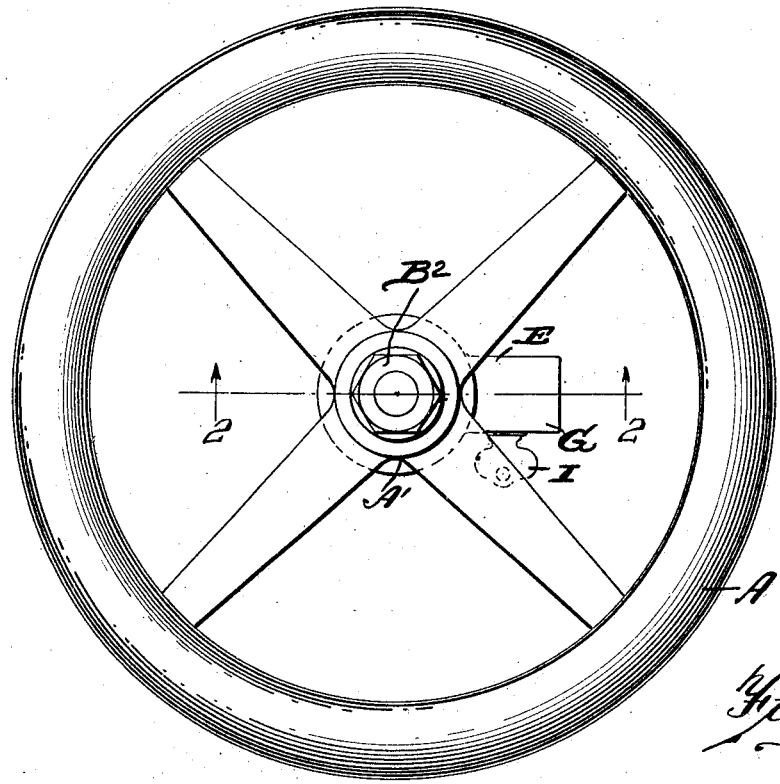
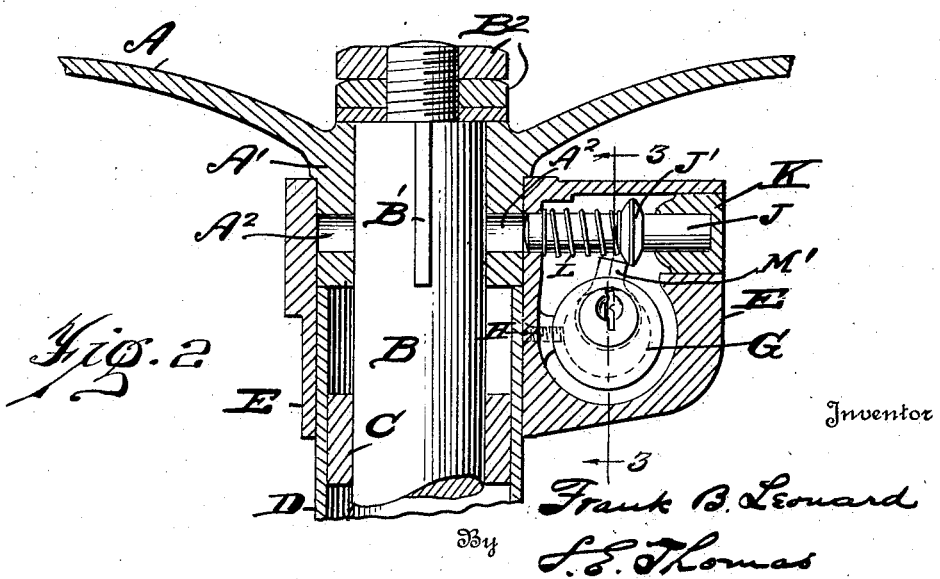

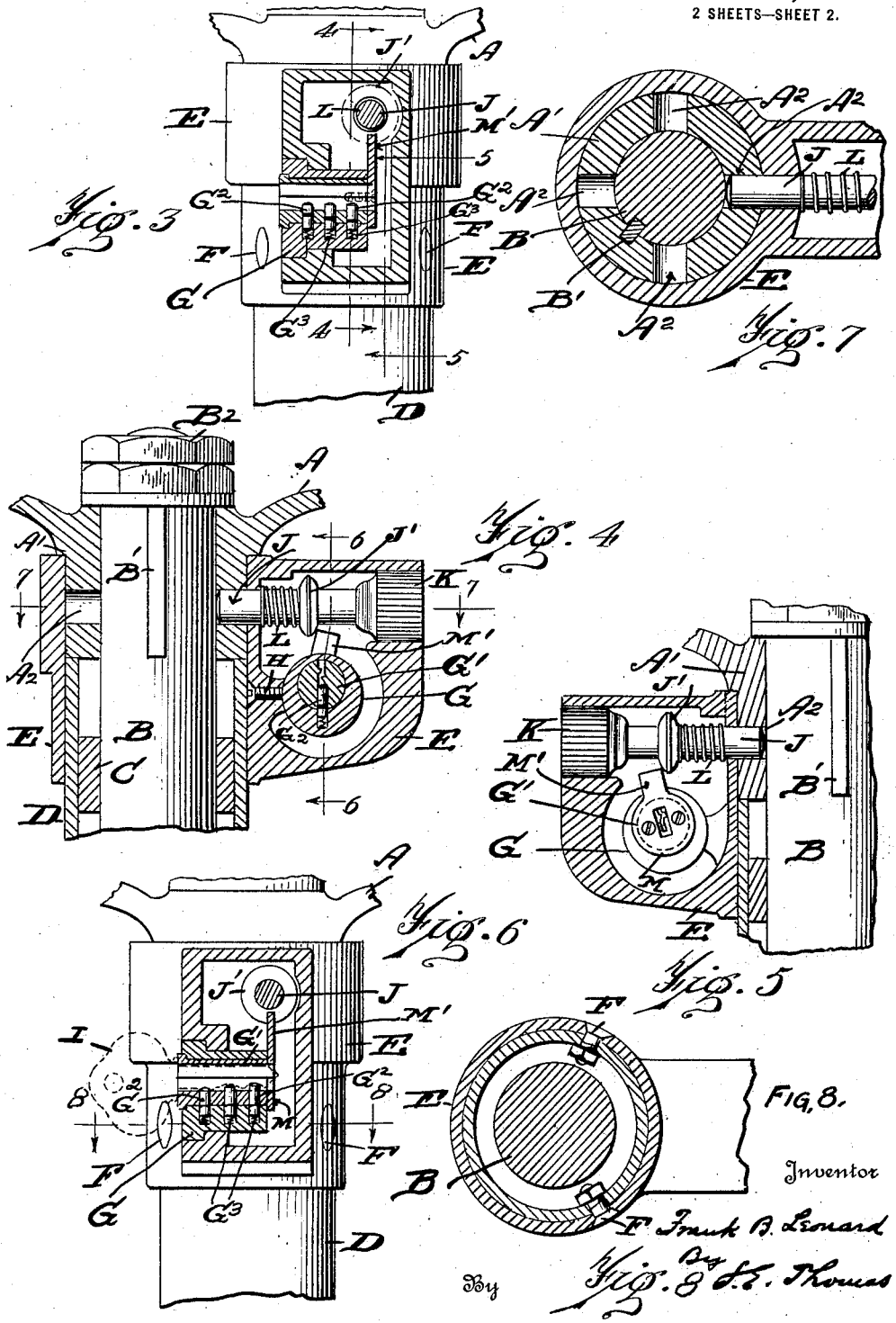

FRANK B. LEONARD, OF LOS ANGELES, CALIFORNIA, ASSIGNOR OF ONE-HALF TO ALFRED E. BEASLEY, OF TORONTO, ONTARIO, CANADA.

AUTOMOBILE-LOCK.

1,393,552. Specification of Letters Patent. Patented Oct. 11, 1921.

Application filed September 17, 1920. Serial No. 410,822.

*To all whom it may concern:*

Be it known that I, FRANK B. LEONARD, citizen of the United States, residing at Los Angeles, county of Los Angeles, State of California, have invented a certain new and useful Improvement in Automobile-Locks, and declare the following to be a full, clear, and exact description of the same, such as will enable others skilled in the art to which it pertains to make and use the same, reference being had to the accompanying drawings, which form a part of this specification.

This invention relates to means for locking the steering wheel of a motor driven vehicle so that the forward traction wheels of the latter may be securely held at an angle to prevent the steering of the vehicle by an unauthorized person during the absence of the owner. Thus the only movement of the vehicle possible would be in a circle or curve having a relatively small radius, preferably directed against the curb, if the front wheels were disposed adjacent to the latter.

One of the objects of this invention is to provide a simple, inexpensive and effective meane whereby the locking bolt employed to secure the steering wheel is securely held both in its locked and in its released relation with the wheel, thus insuring against either the accidental locking or releasing of the respective parts.

With the foregoing and other objects in view which will appear as the description proceeds the invention consists in the combination and arrangement of parts and in the details of construction hereinafter described and claimed, it being understood that changes may be made in the precise embodiment of the invention herein disclosed without departing from the spirit of the same.

In the accompanying drawings forming part of this specification:—

Figure 1 is a plan view of a steering wheel with the locking device in position upon the steering column.

Fig. 2 is an enlarged fragmentary vertical sectional view taken on or about line 2—2 of Fig. 1, showing the locking bolt in released position.

Fig. 3 is a cross-sectional view through the locking mechanism taken on or about line 3—3 of Fig. 2.

Fig. 4 is a vertical-sectional view showing the locking bolt thrown to secure the steering wheel against operation by an unauthorized person.

Fig. 5 is a sectional view taken on or about line 5—5 of Fig. 3 showing in elevation the rocking arm at the end of the lock unit, which serves to shift the locking bolt through the operation of the lock key.

Fig. 6 is a vertical sectional view taken on or about line 6—6 of Fig. 4, indicating the position of the pin-tumblers with reference to the periphery of the cylinder before the removal of the key,—shown in dotted lines.

Fig. 7 is a horizontal sectional view taken on or about line 7—7 of Fig. 4, showing the bolt projecting into one of the radial holes of the steering wheel hub.

Fig. 8 is a horizontal sectional view taken on or about line 8—8 of Fig. 6, showing the means for securing the locking element to the sleeve of the steering column.

Referring now to the letters of reference placed upon the drawings:—

A, denotes the steering wheel, A' its hub provided with a plurality of radial holes $A^2$.

B, indicates the steering post to which the hub is secured by a key B', and the usual nuts $B^2$ engaging its upper threaded end.

C, is a suitable bushing within the sleeve D, through which the steering post extends.

E, indicates a casting fitted to the sleeve D to which it is secured by bolts F, F.

G, indicates a cylinder lock secured in a bore in the casting E, by a screw or bolt H,—extending through the wall of the casting embracing the sleeve D, so as to impinge upon the wall of the lock.

G' is the rotatable cylinder of the lock G, and $G^2$ indicates a plurality of pairs of tumbler-pins adapted to secure the cylinder against rotation due to the action of the springs $G^3$, until compressed by the action of the key I, indicated in dotted lines. J, denotes a slidable locking bolt housed in the casting E, adapted to enter one of the several holes $A^2$ in the steering wheel hub.

The bolt J, is supported at one end in a knurled bushing K, driven flush into a bore in the casting E directly above the lock G,— and is urged to its normal unlocked relation to the steering wheel hub by a spring L, which at one end bears against the wall of the casting E and at the other end against a projecting rib J', formed on the bolt J. M, denotes a disk secured to the end of the rotatable cylinder G' of the lock G, provided with a projecting finger M' adapted to engage the rib J' of the locking bolt J to force the latter to the limit of its movement in either direction upon the rotation of the cylinder by the manual operation of the key I.

Having indicated the sereval parts by reference letters the construction and operation of the device will now be readily understood.

The owner of the vehicle upon leaving the same will first preferably turn the steering wheel so as to direct the forward traction wheels (not shown) toward the curb,—or at an angle to its rear traction wheels.

The key is then inserted in the lock and the rotatable cylinder G' carrying the disk M turned to force the bolt J, into one of the several holes $A^2$ of the steering wheel hub;— the key is then withdrawn. It will now be seen that the several tumbler-pins $G^2$, having been released by the key will be urged under the action of their respective spriongs $G^3$, to lock the cylinder G' against rotation, thus securing the bolt J in locked relation to the hub of the steering wheel and thereby the forward traction wheels in a fixed direction to the rear traction wheels of the vehicle and thus incapable of adjustment until again released.

Should an attempt be made to operate the vehicle under the conditions indicated it could only move toward the curb, or in a restricted arc.

To release the vehicle that it may be again driven, the key is inserted in the lock as before, thus forcing the tumbler-pins back against their respective springs; the lock cylinder G' is now rotated to the limit of its movement, in the opposite direction, the key being then withdrawn;—whereupon the projecting finger M' of the disk M, bearing upon the rib J' of the bolt, (the bolt having been returned to its normal unlocked position by the spring L) will secure the bolt against accidental movement when in its released relation due to the locking action of the tumbler-pins $G^2$ as previously explained.

It will thus be seen that the locking bolt J is positively secured in both its locked and unlocked relation with the hub of the steering wheel upon the withdrawal of the operating key.

Having thus described my invention what I claim is:—

1. A locking device for the steering wheel of a vehicle including a casting secured to the steering column, a slidable bolt provided intermediate its ends with a projecting rib and housed in the said casting and adapted to enter a plurality of apertures in the hub of the steering wheel, said casting being provided at its outer side with a bore of sufficient size to permit the slidable bolt with the projecting rib to pass through it, a spring sleeved on the inner portion of the bolt and bearing against the rib and the inner wall of the casting to force the bolt out of locked relation with the steering wheel hub, a bushing filling the said bore and closed at its outer end and slidably supporting the outer end of the bolt, and a key actuated rotatable cylindrical lock mechanism housed in the casting and having a locking finger arranged to engage the rib for positively moving the bolt into its locked position.

2. A locking mechanism for steering wheels of vehicles including a casting secured to the steering column, a slidable bolt having a projecting rib and housed in said casting and adapted to enter a plurality of apertures in the hub of the steering wheel to secure the steering shaft against rotation, a spring sleeved upon the inner portion of the bolt and bearing against the wall of the casting and against the projecting rib on the bolt to force the bolt out of locked relation with the steering wheel hub, a key actuated rotatable cylinder lock mechanism housed in the casting comprising a rotary cylinder and a plurality of pairs of tumbler pins, and a swinging finger carried by the rotary cylinder and arranged to engage the rib of the bolt from moving the same into locked relation against the action of the spring, said tumbler pins being arranged to lock the swinging finger to hold the bolt in its locked position and also to lock the finger against movement when the bolt is retracted.

In testimony whereof I sign this specification in the presence of two witnesses.

FRANK B. LEONARD.

Witnesses:
A. E. WILLIAMS,
ROBERT H. LORD.